Dec. 29, 1925.

H. H. MORGAN

CONVEYER CHAIN

Filed Nov. 27, 1922

Inventor
Horace H. Morgan

By Whittemore Hulbert Whittemore Belknap
Attorneys

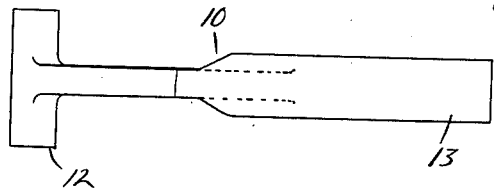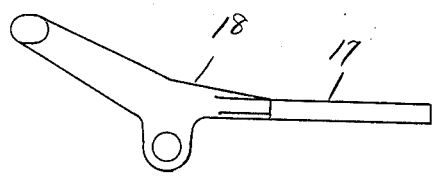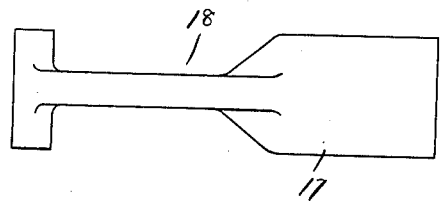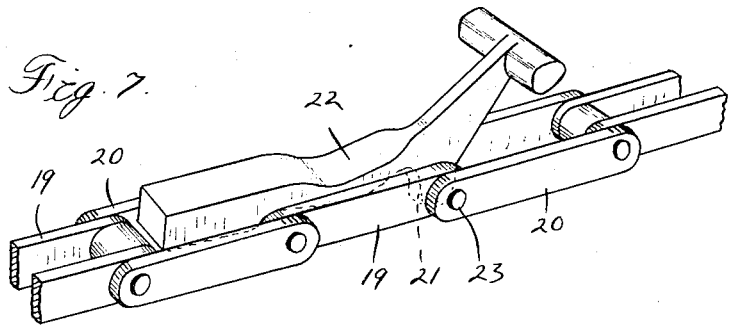

Patented Dec. 29, 1925.

1,567,162

UNITED STATES PATENT OFFICE.

HORACE H. MORGAN, OF DETROIT, MICHIGAN, ASSIGNOR TO PALMER-BEE COMPANY, OF DETROIT, MICHIGAN, A CORPORATION OF MICHIGAN.

CONVEYER CHAIN.

Application filed November 27, 1922. Serial No. 603,684.

*To all whom it may concern:*

Be it known that I, HORACE H. MORGAN, a citizen of the United States of America, residing at Detroit, in the county of Wayne and State of Michigan, have invented certain new and useful Improvements in Conveyer Chains, of which the following is a specification, reference being had therein to the accompanying drawings.

The invention relates to conveyer chains and refers particularly to that type provided with a pusher dog for propelling an object such as a truck or the like which is supported upon the floor independently of the conveyer chain. One of the objects of the invention is to provide a conveyer chain with knock-over pusher dogs which are so arranged that both the upper or working and lower or return portions of the conveyer chain with the pusher dogs will occupy but a minimum space between the member of the truck against which the force is to be applied and the floor. Another object is to provide a conveyer chain with a pusher dog pivotally connected thereto between its sides to permit the minimum size of channel track which would accommodate a plain conveyer chain without any pusher dog attachment. With these and other objects in view, the invention resides in the novel features of construction and combinations and arrangements of parts as more fully hereinafter set forth.

In the drawings:

Figure 4 is a plan view of the pusher dog;

Figures 5 and 6 are respectively a side elevation and plan view of a modified construction of pusher dog;

Figure 7 is a perspective view of a modified construction of conveyer chain with one of my pusher dogs attached.

Figure 1:
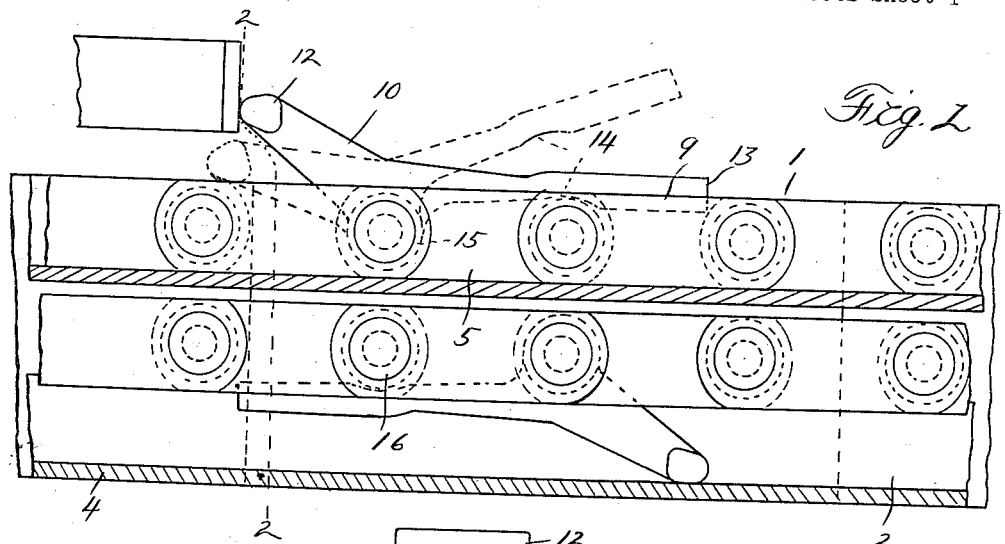
Figure 1 is a side elevation of a conveyer chain embodying my invention.
Figure 2:
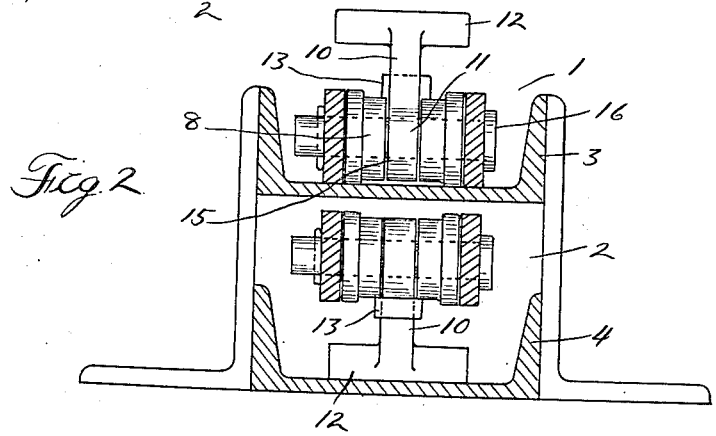
Figure 2 is a cross sectional elevation thereof.
Figure 3:
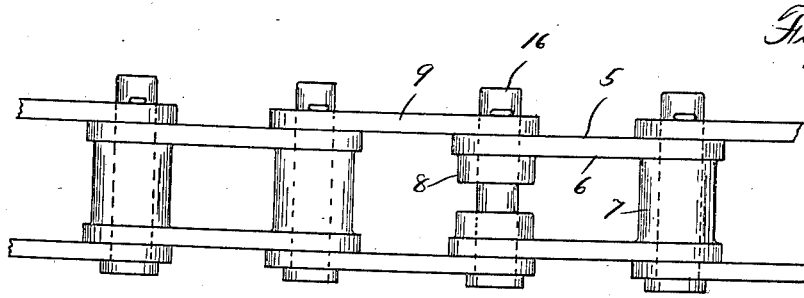
Figure 3 is a top plan view of a portion of the conveyer chain.

The conveyer chain has the upper or working and the lower or return portions 1 and 2 respectively and passes around sprockets at the ends, one of which sprockets is power driven. Both the working and return portions are located in upper and lower channel tracks 3 and 4 respectively. The conveyer chain comprises the alternate links 5, which are formed of solid malleable castings and have the side members 6 and the barrels 7 and 8 at opposite ends thereof, and the pairs of links 9 pivotally connecting and embracing adjacent ends of the links 5.

10 is one of a series of pusher dogs pivotally connected intermediate its end to certain of the links 5 of the conveyer chain and with its pivot portion 11 connected to the barrels 8 of these links. Each pusher dog has the transverse pusher head 12 at one end which is adapted to engage the member of the truck against which the force is to be applied. Each pusher dog also has at the other end the tail 13 which has a width slightly less than the length of the barrel 7 and a weight sufficient to rotate the dog about its pivot so that when the pusher dog is located upon the working portion 1 of the conveyer chain, its pusher head 12 is in position to engage the member of the truck against which the force is to be applied. The tail 13 preferably has in its lower side the recess 14 for fitting over the barrel 7 of the chain link so that the pusher head can be raised to a greater extend above the wearing portion of the conveyer chain.

For the purpose of permitting the minimum size of channel track which would accommodate a plain conveyer chain without any pusher dog attachment, each pusher dog is pivoted to a chain link 5 intermediate its sides. In detail, the central portion of the barrel 8 of the chain link 5 to which a pusher dog is to be attached, is omitted so that the barrel 8 of this chain link comprises two spaced stub barrels. The space between these stub barrels is sufficient to receive the intermediate pivot portion 15 of the pusher dog which has a transverse opening therethrough adapted to register with the transverse openings through the stub barrels and to receive the pivot pin 16 for connecting this end of the link 5 to the pair of adjacent links 9.

In the modified construction shown in Figures 5 and 6, the tail portion 17 of the pusher dog 18 has a width substantially the same as that of the conveyer chain so that this pusher dog when located upon the upper or working portion of the conveyer chain rests upon the upper surfaces of the chain links.

As shown in Figure 7, the conveyer chain comprises alternate inner and outer pairs of pivotally connected links 19 and 20 respectively in which the inner pair of links are separated sufficiently to receive the pivot portion 21 of the dog 22 which is rotatably mounted upon the chain joint pin 23 connecting adjacent ends of the pairs of links.

With the above arrangement of conveyer chain and knock-over pusher dogs, it will be readily seen that both the working and return portions of the conveyer chain with their pusher dogs may require but the minimum distance between the member of the object being pushed and the floor. Also, since the pusher dogs are pivotally connected to the conveyer chain intermediate its sides, the minimum size of channel tracks which would accommodate a plain conveyer chain without any pusher dog attachment, is permissible. Still another advantage is secured by pivotally mounting the pusher dogs upon the pivot pins of the conveyer chain links.

What I claim as my invention is:

1. The combination with a conveyer chain having a series of pivotally connected links, of a dog having a head, a tail, and an intermediate pivot portion, said pivot portion being connected to the chain by one of the pivots connecting the links and said tail extending over an adjacent pivot connecting the links.

2. The combination with a conveyer chain having one of its links provided with sides and aligned spaced stub barrels, of a dog upon said chain having a pivot portion located between said stub barrels and pivotally connected thereto and a second portion overlapping a link connected to the end of said first-mentioned link opposite to said stub barrels.

In testimony whereof I affix my signature.

HORACE H. MORGAN.